United States Patent
Beerens et al.

(10) Patent No.: US 9,579,754 B2
(45) Date of Patent: Feb. 28, 2017

(54) METHOD FOR THERMALLY JOINING NON-ROUND FUNCTIONAL COMPONENTS TO A SHAFT

(71) Applicant: Mahle International GmbH, Stuttgart (DE)

(72) Inventors: Christoph Beerens, Stuttgart (DE); Frank Dautel, Gerlingen (DE); Antonio Menonna, Ditzingen (DE)

(73) Assignee: Mahle International GmbH (DE)

( * ) Notice: Subject to any disclaimer, the term of this patent is extended or adjusted under 35 U.S.C. 154(b) by 337 days.

(21) Appl. No.: 14/135,563

(22) Filed: Dec. 19, 2013

(65) Prior Publication Data
US 2014/0173895 A1    Jun. 26, 2014

(30) Foreign Application Priority Data

Dec. 20, 2012  (DE) .......... 10 2012 224 064
Feb. 19, 2013  (DE) .......... 10 2013 202 657

(51) Int. Cl.
*B23P 11/02*   (2006.01)
*F16D 1/08*    (2006.01)
(Continued)

(52) U.S. Cl.
CPC .......... *B23P 11/025* (2013.01); *F16D 1/0858* (2013.01); *F16H 53/025* (2013.01);
(Continued)

(58) Field of Classification Search
CPC ..... B23P 11/025; B23P 2700/07; B23P 11/02; F16D 1/0858; F16D 1/087; F16D 1/093;
(Continued)

(56) References Cited

U.S. PATENT DOCUMENTS 5,107,805 A * 4/1992 Butterfield .............. F01L 1/047
                                                 123/90.17
5,822,837 A * 10/1998 Schwellenbach ....... B23P 11/02
                                                      29/450
(Continued)

FOREIGN PATENT DOCUMENTS

CH      461183 A    8/1968
CN      1392814 A   1/2003
(Continued)

OTHER PUBLICATIONS

German Search Report File No. 102013202657.9 dated Mar. 27, 2014.
(Continued)

*Primary Examiner* — Christopher Besler
(74) *Attorney, Agent, or Firm* — Fishman Stewart PLLC

(57) ABSTRACT

A method may include thermally joining at least one of a non-round functional component to a shaft and a cam to a camshaft, elastically compressing the functional component during introduction of a round through-opening, and creating a through-opening which is not round when the functional component is unstressed and at least minimizes an asymmetrical deformation of the shaft after the thermal joining of the functional component to the shaft.

20 Claims, 3 Drawing Sheets

(51) Int. Cl.
*F16H 53/02* (2006.01)
*F16B 4/00* (2006.01)

(52) U.S. Cl.
CPC ........... *B23P 11/02* (2013.01); *B23P 2700/02* (2013.01); *F16B 4/006* (2013.01); *Y10T 29/49293* (2015.01)

(58) Field of Classification Search
CPC .... F16B 4/006; F16B 4/004; Y10T 29/49286; Y10T 29/49293; Y10T 29/49552
See application file for complete search history.

(56) References Cited

U.S. PATENT DOCUMENTS

2002/0180165 A1  12/2002  Retzbach et al.
2012/0198681 A1* 8/2012  Fauchet .................. F16B 4/006
                                              29/447

FOREIGN PATENT DOCUMENTS

| | | |
|---|---|---|
| DE | 19521755 C1 | 10/1996 |
| DE | 19624048 A1 | 12/1997 |
| DE | 102006036820 A1 | 2/2008 |
| DE | 102007015153 A1 | 9/2008 |
| DE | 102008064194 A1 | 7/2010 |
| FR | WO 2011/004104 A1 * | 1/2011 .............. B23P 11/02 |
| JP | H04365907 A | 12/1992 |
| WO | WO-0226429 A1 | 4/2002 |

OTHER PUBLICATIONS

European Search Report for EP13195254.1 dated Apr. 24, 2014.
English Abstract for DE102008064194A1.
English Abstract for DE102007015153A1.
English Abstract for JPH04365907A.
English Abstract for DE19521755C1.
English Abstract for DE102006036820A1.
Chinese Office Action for CN-201310700755.8, dated Aug. 2016.

* cited by examiner a)

b)

c)

d)

METHOD FOR THERMALLY JOINING NON-ROUND FUNCTIONAL COMPONENTS TO A SHAFT

CROSS-REFERENCE TO RELATED APPLICATIONS

This application claims priority to German Patent Applications 10 2012 224 064.0 filed Dec. 20, 2012, and DE 10 2013 202 657.9 filed Feb. 19, 2013, both of which are hereby incorporated by reference in their entirety.

TECHNICAL FIELD

The present invention relates to a method for thermally joining non-round functional components to a shaft, in particular for thermally joining cams to a camshaft. The invention also relates to such a non-round functional component and to a camshaft thermally joined to at least one such functional component.

BACKGROUND

During joining of non-round, asymmetrical functional components, in particular during thermal joining of cams (pump cams or valve actuation cams) to camshafts, deformation of the tube, that is, the shaft can occur in the region of the functional components, that is, in the region of the cams, owing to the transverse press fit and the associated overlap between the cam bore and the camshaft tube diameter. In the case of bearing points which are arranged adjacently to the functional components, this can result in deviations from the round shape, which lie outside specifications for good bearing. In such cases, the bearing points may have to be subsequently ground after the functional components have been joined, which however represents an additional manufacturing step, since the shaft has already been ground previously. The additional manufacturing step is not only complex and time-intensive, but also expensive.

SUMMARY

The present invention is therefore concerned with the problem of specifying an improved method for thermally joining non-round functional components to a shaft, in which deviations of the shaft following the thermal joining of the functional component can be at least minimised, preferably even eliminated.

This problem is solved according to the invention by the subject matter of the independent claims. Advantageous embodiments form the subject matter of the dependent claims.

The present invention is based on the general concept of elastically prestressing, that is elastically compressing, a non-round functional component for thermal joining to a shaft, for example a cam for thermal joining to a camshaft, during the introduction of a round through-opening, that is for example during drilling of the cam bore, so that a non-round through-opening is produced after destressing. This non-round through-opening has the effect, after thermal joining to the shaft, that the latter does not or at least only minimally deforms, so that the shaft retains its circular shape after thermal joining, which is of great significance for bearing points arranged adjacently to the functional components. Complex and expensive post-machining of the shaft, for example subsequent grinding, which was previously sometimes necessary, is in particular no longer necessary thanks to the prevention of deformation of the shaft after cooling of the functional components joined to it, so that the functional components, that is in the concrete case the cams, can be joined to the shaft in a fully machined state.

The functional component is expediently elastically compressed, that is, elastically prestressed, by means of a jaw-type clamping device during the introduction of the through opening. Such a jaw-type clamping device can for example have three or four jaws, which can be pressed in an individually force- or distance-controlled manner against the functional component to be manufactured, as a result of which the latter is put in an elastic deformation state. In this elastic deformation state, the through-opening, for example a cam bore, is then introduced and initially has a circular shape. If the jaw-type clamping device is destressed, that is, the jaws are removed from the functional component, the latter deforms back into its original state, as a result of which the originally round through-opening then changes into an approximately oval shape. This oval or non-round shape has the effect during thermal joining in which the shaft is for example cooled and/or the functional component is heated, that after temperature equalisation preferably only equal radial forces distributed over the circumference of the through-opening act on the shaft, that is in particular on the camshaft, as a result of which the latter undergoes considerable transverse compression, but does not lose its original round shape.

In a further advantageous embodiment of the method according to the invention, the through-opening is drilled, ground, reamed, turned or milled. Just this non-exhaustive list demonstrates how multifarious the possibility of producing a through-opening or a through-bore in the functional component, for example the cam, is. The through-opening is usually drilled and then post-machined by means of a cutting tool, for example a milling tool or a grinding tool.

The elastic compression for prestressing the functional component expediently takes place in a force-controlled or distance-controlled manner by means of the individual jaws of the jaw-type clamping device. Depending on the configuration of the functional component to be prestressed, it can be sensible to carry out a force control or a distance control of the individual jaws of the jaw-type clamping device. The force and distance control must take place such that it balances the deformability of the functional component, in order to achieve good centering of the bore in each case, even when deformed. This makes it possible to machine finished functional components, that is in particular cams, within the meaning of the invention and to join them to the shafts without post-machining being necessary. Distance-controlled clamping has the advantage that no complex force measurement devices must be positioned in the clamping device, only the distance covered must be detected, for example by means of a precision spindle. Force-controlled clamping of the functional component would however result in higher precision. It is also simpler during development using simulations to calculate the deformation of the functional component by the application of forces than by the displacement of further bodies against the functional component.

In a particularly advantageous configuration of the method according to the invention, in a first step the functional component is centred and elastically deformed in a force-controlled manner with at least three jaws. In a second step, at least three flat clamping jaws clamp the functional component axially flat against a flat surface and fix the functional component securely in a distance-controlled manner for the machining of the through-opening. The flat clamping jaws are pivoted in over the end faces of the functional component and then pressed by an axial movement against the end face of the functional component. The functional component can be placed into the clamping device and securely fixed without problems with this procedure. The required clamping force of the force-controlled jaws is applied with spring packages. The necessary force can thus be adapted simply to the functional component to be machined by changing the springs in the jaw chuck, and thus different geometries and dimensions can be taken into account.

In particular by means of a configuration of the jaws so that on clamping of the functional component by at least three jaws, the functional component is stressed at two contact zones, so that the holding points are situated close to the intersection point of a line through the centre of the through-opening and the tip of the ovality or respectively oval subsequently situated in the through-opening. Thus, a particularly advantageous deformation of the functional component is attained, which achieves a maximum effect. Since in the case of a clamping with approximately opposite points and with a non-symmetrical component, such as for example a cam, the exact centering by the jaws can prove to be difficult, in a further advantageous configuration of the jaws, the functional element can be centred by auxiliary clamping devices before contact of the jaws.

The present invention is further based on the general concept of providing a non-round functional component, such as a cam, with a non-round through-opening, which at least minimises deformation of the shaft after the thermal joining of the functional component. The production of the through-opening takes place according to the method described in the above paragraphs, in which the functional component is prestressed first and then the through-opening is introduced with a conventional drill. Owing to the subsequent destressing, the through-opening deforms for example in the manner of an oval, which results on thermal joining with a shaft, for example a camshaft, in radial forces, which act uniformly on the shaft and effect no or no significant deformation of the shaft, being present after the heated functional component has cooled or after the cooled shaft has expanded.

The join play between the functional component and the shaft is defined by the oval shape of the through-opening of the functional component, by the short diameter of the oval. So that this join play is not impaired by the introduced of the oval shape of the through-opening, in a further advantageous configuration of the method according to the invention, the functional component is held during the joining process, in particular during the introduction of the shaft into the through-opening of the heated functional component, by a gripping device having at least two gripping jaws in such a manner that an elastic deformation of the functional component is produced analogously to the machining of the bore and thus the oval shape of the through-opening becomes virtually circular again. The available join play is thus considerably increased, and the overlap between the functional component and the shaft can be increased.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
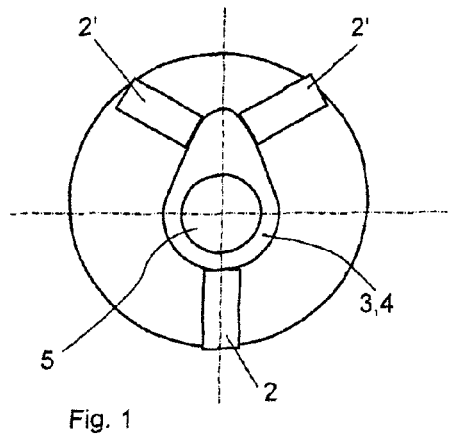
FIG. 1 schematically shows a jaw-type clamping device for clamping a functional component, in this case a cam, during the introduction of a through-opening, FIG. 2 schematically shows a diagram as in FIG. 1, but with a jaw-type clamping device having four jaws, FIG. 3 schematically shows a diagrammatic and exaggerated deformation of the non-round through-opening in the destressed state, FIG. 4 schematically shows a sectional diagram through a camshaft, FIG. 5 *a-d* schematically show a jaw-type clamping device for clamping functional components, in this case cams, showing different clamping states of the jaws, FIG. 6 schematically shows a gripping device for holding and elastically deforming a functional component, in this case a cam during the thermal joining process, FIG. 7 schematically shows a diagrammatic illustration of the force-controlled clamping with springs with a jaw-type clamping device as in FIG. 5, FIG. 8 schematically shows a further possible embodiment of the clamping device according to the invention with differently configured jaws.
Figure 2:
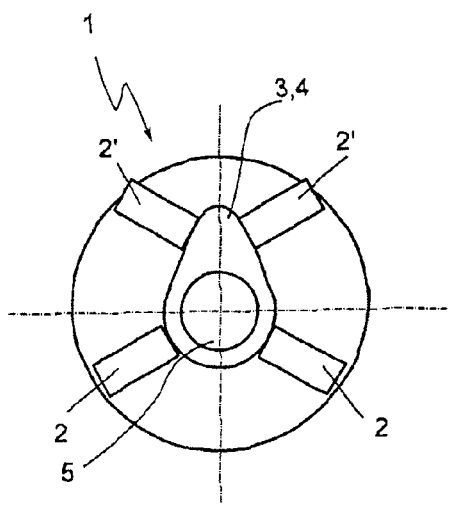

According to FIGS. 1 and 2, a jaw-type clamping device 1 has three or four jaws 2, 2' for clamping a functional component 3, in this case a cam 4. The cam 4 is thus clamped in the jaw-type clamping device 1 and elastically deformed at least slightly by means of the individual jaws 2, 2'. In this elastically deformed, that is in particular compressed, state, a through-opening 5 is introduced, for example drilled, ground, reamed, turned or milled, by means of a machine (not shown). The jaws 2, 2' then move into their starting position, as a result of which the clamped functional component 3 or cam 4 is destressed. In this destressed state, a non-round through-opening 5' is then formed owing to the elastic back-deformation from the through-opening 5 which was originally round in the stressed state, as is shown in an exaggerated manner in FIG. 3.

The cam 4 or generally the functional component 3 can now be heated and an associated shaft 6 or camshaft 7 can be cooled. During the thermal fitting of the functional component 3 on the shaft 6, a press fit is created, which exerts essentially radial forces on the shaft 6, so that the latter is not or only marginally deformed and thereby retains its round shape during the production of the shrink fit, that is, during cooling of the functional components 3 or cam 4. Such a round shape is of essential importance in particular for bearing points 8 arranged adjacently to the functional components 3, since these bearing points must be absolutely round to allow smooth-running and long-lasting bearing.

Figure 3:
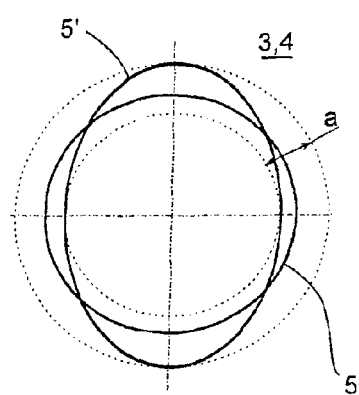
Figure 4:
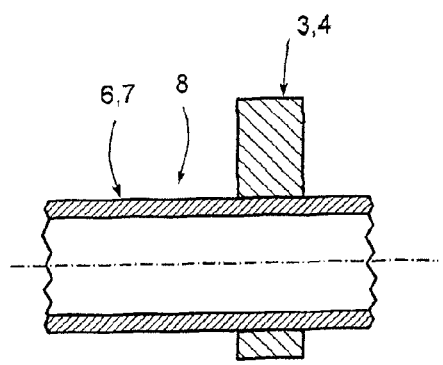

The elastic compression or prestressing of the functional component 3 by means of the jaws 2, 2' can take place in a force- or distance-controlled manner. It is likewise conceivable for at least one jaw 2, 2'''' (cf. also FIG. 5) of the jaw-type clamping device 1 to press, that is, to be prestressed against the functional component 3 with a greater force than the at least one other jaw 2', 2". Of course, it is possible for only individual jaws 2, 2' to be adjustable. The jaw-type clamping device 1 shown according to FIGS. 1 and 2 is intended to illustrate merely by way of example that the functional component 3 to be provided with the through-opening 5 can be prestressed in an individual manner to produce the non-round through-opening 5'. According to FIG. 3, the through-opening 5' is oval when the functional component 3 is destressed, the long and short diameters differing by approx. 5 to 25 nm, which is shown in FIG. 3 with the reference symbol a.

Figure 5:
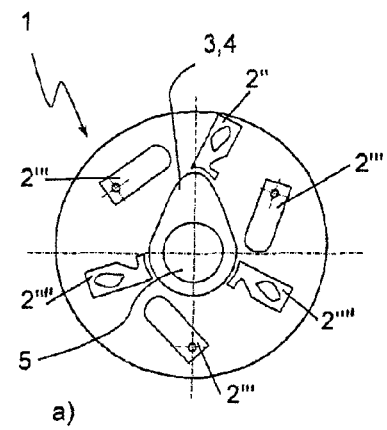
Figure 5:
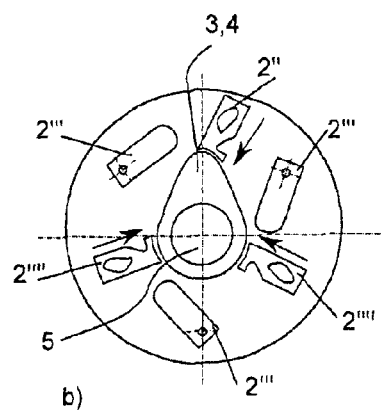
Figure 5:
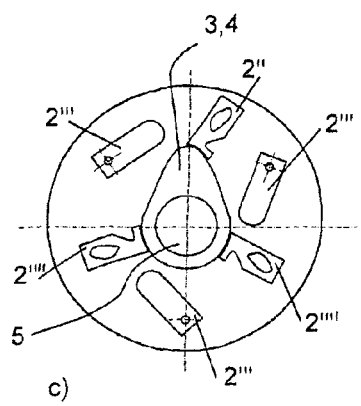
Figure 5:
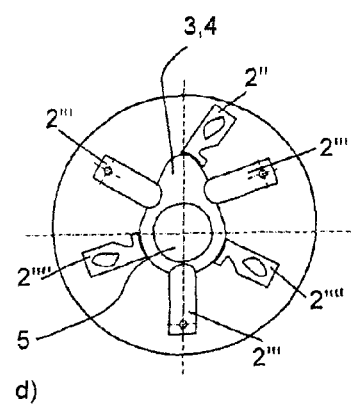

FIG. 5 shows a jaw-type clamping device 1 in a particularly advantageous embodiment, in several clamping states a) to d). The embodiment of the jaw-type clamping device 1 in FIG. 5 is characterised by two different sets of jaws 2", 2"" and 2'". The jaws 2", 2"" are provided to centre the functional component 3, in the case shown here a cam 4, and to elastically deform it as desired in a force-controlled manner. Further three clamping jaws 2' are distance-controlled and provided to clamp the functional component 3 firmly against a flat surface and thus to position it securely for machining of the through-opening 5.

In step a), a cam 4 is shown, which has been placed into the jaw-type clamping device 1 for machining. In step b), the jaws 2", 2"' move towards the cam 4 and centre and deform the cam 4. For elastic deformation of the functional component 3, the jaws 2" can be pressed more against the functional component than the jaws 2"'. In step c), the cam 4 has been centred and deformed by the jaws 2", 2'". In step d), the clamping jaws 2' have been pivoted over the end face of the cam 4 and clamped in the axial direction in such a manner that the cam 4 has been positioned securely for machining of the through-opening 5.

Figure 7:
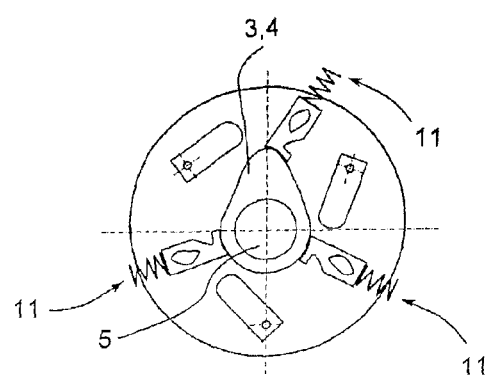

The force-controlled centering and deformation of the functional component 3 by means of the jaws 2", 2'" can take place by means of spring packages 11, as is shown diagrammatically in FIG. 7. If the force is introduced purely through the prestressed spring package 11, the introduced force can be controlled exactly. The jaw-type clamping device 1 can be adapted to different functional components 3 by simply changing the springs 11, which allows a simple and reliable clamping system.

Figure 6:
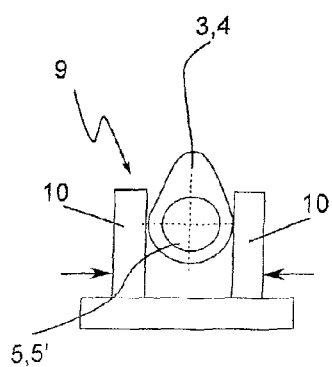

A gripping device 9 shown in FIG. 6 makes it possible to held a functional component 3, in the case shown a cam 4, in the joining position by means of grippers 10 during the joining process and to deform the functional component 3 elastically in such a manner that the oval through-opening 5' becomes a circular through-opening 5 again, and thus the joining process, in particular the available join play, is hardly affected at all by the oval machining of the through-opening 5'. This is particularly advantageous for a process-reliable joining operation.

Figure 8:
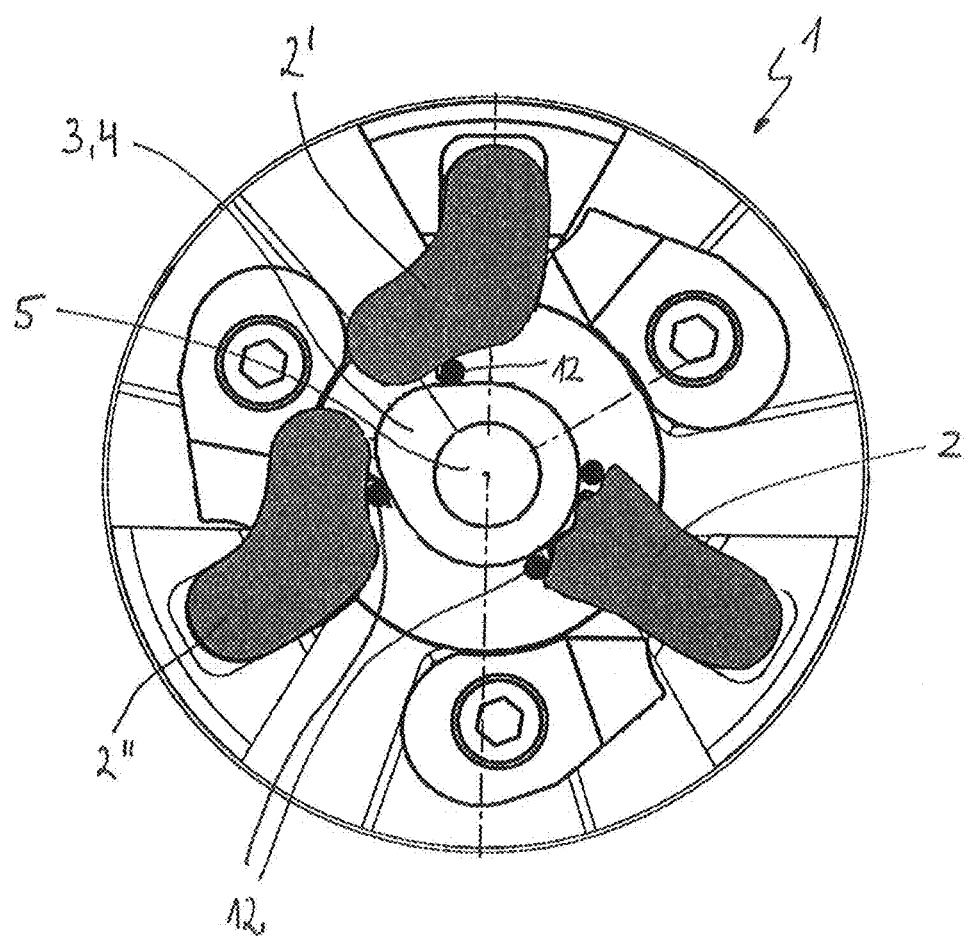

Regarding the clamping device 1 according to FIG. 8, this has three jaws 2, 2' and 2". The jaw 2 engages here on a base circle of the functional component 3, here of the cam 4, wherein between the jaw 2 and the functional component 3 clamping elements 12 of an auxiliary clamping device are arranged. These clamping elements 12 are, for example, spherical or cylindrical and are usually spring-preloaded. The auxiliary clamping device is intended to ensure that the functional component 3, or respectively the cam 4, is positioned correctly before the contact with the jaws 2, 2', 2" and in particular is centred, without forces which are too great having to be applied for this. This is advantageous, because otherwise a reliable centering by the close clamping at the cam tip and precisely opposite jaw 2 is not guaranteed (cam 4 could be clamped obliquely).

With the clamping device 1 shown according to FIG. 8, the cam 4 is clamped such that the cam side lying opposite the cam tip, i.e. the base circle, is supported by the jaw 2, so that the holding points lie close to the point of intersection of a line through the centre of the through-opening 5 and the cam tip. As can be seen here from FIG. 8, the jaw 2 has an undulated contact contour, so that it would touch the cam 4 without the clamping elements 12 at two holding points (contact sites). The same applies in the use which is shown with clamping elements 12. At least two further jaws 2', 2" clamp the cam 4 close to the cam tip on both sides thereof The at least three jaws 2, 2', 2" therefore clamp the cam 4 at two, in total four, holding points in two contact regions, which lie in the region of the cam tip and of the opposite base circle, so that the holding points are situated close to the point of intersection of a line through the centre of the through-opening (5) and of the tip of the ovality which is later situated in the through-opening (5).

The two jaws 2' and 2" have a non-symmetrical shape, whereby a contact (holding point) to the cam 4 is to be achieved as close as possible to the cam tip. Here also, again clamping elements 12 are arranged between the jaws 2' and 2" and the cam 4.

With the introduction according to the invention of a through-opening 5' which is not round when the functional component 3 is destressed, the press behaviour, which was previously difficult to estimate, can be controlled exactly, it being possible in particular for the forces acting on the shaft 6 during production of the press fit to be aligned in such a manner that the shaft 6 does not change or only changes marginally in terms of its round outer contour, and as a result in particular does not have to be post-machined, which means considerable advantages in costs and time.

The individual jaws 2, 2', 2", 2'" of the jaw-type clamping device 1 can be arranged symmetrically in relation to the functional component 3 to be held and prestressed, an asymmetrical arrangement also being conceivable, however.

The through-opening 5, for example cam bore, produced in the stressed state of the functional component 3 is round, whereas this through-opening 5 turns into a non-round through-opening 5' owing to the elastic back-deformation after destressing of the functional component 3. The non-round through-opening 5' is shown slightly exaggerated in FIG. 3. In the joined state, the non-round through-opening 5' [becomes] a through-opening 5 again, which lies uniformly around the circumference of the shaft, in particular the camshaft, as a result of which a high level of force transmission and at the same an optimal press fit can be achieved.

The invention claimed is:

1. A method, comprising:
    thermally joining a non-round receiving component to a shaft, wherein, prior to thermally joining the receiving component to the shaft, elastically compressing the receiving component and forming a round through-opening when the receiving component is elastically compressed, wherein the through-opening is non-round when the receiving component is unstressed and at least minimizes an asymmetrical deformation of the shaft after the thermal joining of the receiving component to the shaft.

2. The method according to claim 1, wherein the receiving component is compressed by a jaw-type clamping device during the formation of the through-opening.

3. The method according to claim 2, wherein at least one jaw of the jaw-type clamping device is pressed against the receiving component with a greater force than at least one other jaw.

4. The method according to claim 1, wherein the elastic compression takes place in at least one of a force-controlled and a distance-controlled manner such that a centering of the receiving component is provided after joining.

5. The method according to claim 1, wherein elastically compressing the receiving component includes centering and elastically deforming the receiving component in a force-controlled manner by a plurality of jaws in a jaw-type clamping device, and clamping the receiving component axially against a flat surface in a distance-controlled manner with a plurality of flat clamping jaws, and wherein forming the through-opening of the receiving component includes machining the through-opening in the receiving component when the receiving component is elastically compressed.

6. The method according to claim 5, wherein the plurality of jaws are prestressed by spring packages and a pressing force necessary for the elastic deformation of the receiving component can be adapted to different receiving components to be machined for forming the through-opening by changing the spring packages.

7. The method according to claim 5, wherein the receiving component is a cam, and wherein clamping includes the plurality of jaws engaging the cam at two contact regions which lie in a region of a cam tip and of an opposite base circle.

8. The method according to claim 5, wherein the plurality of jaws centre and elastically deform the receiving component via clamping elements before clamping the receiving component with the plurality of flat clamping jaws.

9. The method according to claim 1, wherein forming the through-opening includes at least one of drilling, grinding, reaming, turning and milling.

10. The method according to claim 1, further comprising holding the receiving component by a gripping device during at least one of thermally joining the receiving component to the shaft and introducing the shaft into the through-opening such that the non-round through-opening becomes round due to elastic deformation.

11. The method according to claim 1, wherein at least one of the receiving component is a cam and the shaft is a camshaft.

12. The method according to claim 6, wherein the plurality of jaws center and elastically deform the receiving component via clamping elements before clamping the receiving component with the plurality of flat clamping jaws.

13. A method, comprising:
thermally joining a non-round receiving component to a shaft, wherein the thermal joining includes:
elastically compressing the receiving component and forming a round through-opening when the receiving component is elastically compressed; and
joining the receiving component onto the shaft;
wherein the through-opening is non-round when the receiving component is unstressed and at least minimizes an asymmetrical deformation of the shaft after thermally joining the receiving component to the shaft.

14. The method according to claim 13, wherein the receiving component is a cam and the shaft is a camshaft.

15. The method according to claim 13, wherein the elastic compressing includes compressing the receiving component by a jaw-type clamping device during forming the through-opening.

16. The method according to claim 15, wherein compressing the receiving component includes at least one jaw of the jaw-type clamping device pressed against the receiving component with a greater force than at least one other jaw.

17. The method according to claim 16, wherein the elastic compression takes place in at least one of a force-controlled and a distance-controlled manner such that a centering of the receiving component is provided after thermal joining.

18. The method according to claim 13, wherein elastically compressing the receiving component includes centering and elastically deforming the receiving component in a force-controlled manner by a plurality of jaws in a jaw-type clamping device, and clamping the receiving component axially against a flat surface in a distance-controlled manner with a plurality of flat clamping jaws, and wherein forming the through-opening of the receiving component includes machining the through-opening in the receiving component when the receiving component is elastically compressed.

19. The method according to claim 18, wherein the receiving component is a cam, and wherein clamping includes the plurality of jaws engaging the cam at two contact regions disposed in a region of a cam tip and of an opposite base circle.

20. The method according to claim 13, wherein forming the through-opening includes at least one of drilling, grinding, reaming, turning and milling.

* * * * *